(12) United States Patent
Lund

(10) Patent No.: US 6,324,270 B1
(45) Date of Patent: Nov. 27, 2001

(54) SYSTEM FOR COORDINATION OF ELECTRONIC DEVICES

(75) Inventor: Arnold M. Lund, Louisville, CO (US)

(73) Assignee: Qwest Communications Int'l., Inc., Denver, CO (US)

(*) Notice: Subject to any disclaimer, the term of this patent is extended or adjusted under 35 U.S.C. 154(b) by 0 days.

(21) Appl. No.: 09/114,455

(22) Filed: Jul. 13, 1998

(51) Int. Cl.[7] ....................................................... H04M 1/56
(52) U.S. Cl. ....................... 379/142; 379/172; 379/88.21; 379/93.23; 379/102.03
(58) Field of Search ............................... 379/88.19–88.21, 379/93.09, 93.23, 102.01, 102.02–102.06, 106.01, 120, 127, 142, 354, 167, 170, 171, 172–173, 110.01, 102.03

(56) References Cited

U.S. PATENT DOCUMENTS

| 5,127,045 | * | 6/1992 | Cragun et al. ........................... 379/88 |
| 5,544,036 | * | 8/1996 | Brown, Jr. et al. ................... 364/145 |
| 5,737,400 | * | 4/1998 | Bagchi et al. ........................ 379/142 |
| 5,748,706 | * | 5/1998 | Morgan et al. ......................... 379/37 |
| 5,881,023 | * | 3/1999 | Gu et al. ................................. 368/10 |

OTHER PUBLICATIONS

Http://hometeam.com/+10+10tech.htm (X–10) Technology Transmission Theory) May 18, 1998; 4 pages.
Http://www.engr.trinity.edu/~ha/+10.html (X–10 Information) May 18, 1998; 2 pages.
Http:www.cs.ualberta.ca/~wade/HyperHome/Faq/faqsection1.html#Q101(FAQ Section 1 : General Information) May 6, 1998 15 pages.

* cited by examiner

*Primary Examiner*—Duc Nguyen
(74) *Attorney, Agent, or Firm*—Marsh Fischmann & Breyfogle LLP

(57) ABSTRACT

A system provides for the coordination of caller ID devices connected to a common telephone line and additionally may provide control of a number of electronic appliances within a home or building. Within a home or building, caller ID devices as well as a number of electronic appliances receive electrical energy through the electronic power lines. Each of the caller ID devices includes a processor which allows the transmission of control signals over the power lines in order that all caller ID devices on the same telephone line can be synchronized. This system can be further expanded to include a home controller which, via the power lines controls the operation of the electronic appliances. The home controller is connected to the common telephone line, and may download information and generate the appropriate command signals to control remotely located appliances.

16 Claims, 10 Drawing Sheets

US 6,324,270 B1

SYSTEM FOR COORDINATION OF ELECTRONIC DEVICES

FIELD OF THE INVENTION

The present invention relates to a system for coordinating electronic devices, and in particular, to providing the coordination through the use of telecommunications devices.

BACKGROUND OF THE INVENTION

Phone lines are currently capable of carrying many types of information which include data and voice transmissions. In recent times, both of these types of information can be incorporated into a single transmission over a phone line. Currently, when a phone call is placed, the call may include information about the phone number of the phone from which the call is being placed, as well as the name of person who is listed with that phone number. Many telephone service providers and other businesses now provide caller ID boxes which translate the non-voice information included in the phone call and present it to the receiver of the phone call prior to the phone being taken off-hook. Through use of this box, the receiver of the phone call can tell in advance who is calling and whether or not to take that phone call. In the situation where the person receiving the phone call is not present, the caller ID box will store this non-voice information in memory. At a later time, the information may be retrieved and reviewed. As the log of received calls is being reviewed, selected calls may be deleted through activation of user interface control.

In many homes and businesses, multiple caller ID boxes may be connected to the same telephone line. Just as multiple phones can be on the same line, these boxes will each receive the incoming telephone calls and display and store the caller ID information. Because the only connection between these caller ID boxes is a common telephone line, any manual update of one caller ID box will not be reflected in any of the other caller ID boxes. Further, in some cases the devices can get out of synchronization with one device showing a new call has arrived and another indicating that calls have been answered.

SUMMARY OF THE INVENTION

Described herein is a system which provides for the coordination and control of remotely located electronic devices. In one aspect of the invention, coordination is provided between caller ID devices connected to a common telephone line. The caller ID devices may include a broad class of devices that display caller and other information, and manage this information. This class of devices includes "display telephones" (e.g., ADSI telephones) and other similar devices. A caller ID device connected to the telephone line displays information about a phone call being received. This information may include the phone number and name of the person listed at the phone number from which the call is being placed. The caller ID device receives electrical energy from a power line to which at least one other caller ID device on the same telephone line is connected. Each of the caller ID devices includes a display and a long term memory. The display presents all the incoming call information in a readable form and the memory stores this information for retrieval at a later time. The caller ID devices also include external user input controls which allow the person receiving the telephone calls to check through a log of received phone calls and delete selected ones.

In the case where caller information is deleted from one caller ID device connected to the common line, the present invention provides a system which automatically updates the other caller ID devices connected to the same phone line. At the time a particular call is manually deleted from one caller ID device, the processor notes identifying information for that call and generates a command signal for deleting the message. The processor transmits the command for deleting a particular message to a converter/transmitter included in the caller ID device. Using a predetermined protocol, the converter/transmitter converts and then transmits the deletion command signal over the power lines so that it is received at the other caller ID devices. Each caller ID unit includes a converter/transmitter and decodes the signal upon receipt. The translated command signal is then provided to the processor which in turn deletes the identified call from memory. These functions may be performed from any of the caller ID devices attached to the common telephone line and which are receiving electrical energy over the power lines.

In one aspect of the invention, a number of common household appliances, which may include a television, audio equipment, and environmental controls, may receive and respond to control signals received from the caller ID device. Connected between each appliance and the power lines is a receiver which translates signals transmitted over the power lines. The receivers affect the operating status of the appliances in response to the control signals. The processor in the caller ID device may generate a command signal which orders the performance of a number of functions in response to the detection of an incoming phone call. One function may be turning on of lights in the vicinity of phones located throughout the home or business when an incoming call is detected. Once a phone is answered, the home controller may turn off the lights in the vicinity of the phones that were not used to answer the call. When the phone call is completed, the processor may then turn off lights around the phone which was used.

Another function that the processor may perform is changing of the operational status of appliances located in the vicinity of a telephone once it is answered. The receiver for each appliance has a specific address and will only respond when a specially coded signal is received. When an incoming phone call is answered, the caller ID device connected to the phone which is used to answer the call may transmit a control signal addressed to particular appliances to turn off or otherwise change their operational status. For example, if the phone that is answered is near a television set, the processor in the caller ID device may turn off the television set in the vicinity or possibly mute or turn down the volume in accordance with preprogrammed instructions.

In another aspect of the invention, the timing information associated with the incoming calls (e.g., timing information sent as part of signals from the incoming calls or timing tracked in the device itself) may be used to update clocks receiving energy from the power lines. These clocks may be stand alone electric clocks, or they may be clocks incorporated into other appliances. The processor in the caller ID device may convert time information into command signals which then are transmitted over the power lines. Receivers located between the clocks and the power lines translate this timing information and provide command signals for updating the time.

In yet another aspect of the invention, the caller ID devices may communicate with each other through a hard wired circuit or over a wireless network. With the hard wire circuit, the home controller responds to an incoming phone call and sends commands out over the hard circuit. Each appliance has a receiver which translates the command signals. Command signal may also be sent out by a wireless transmitter to remotely located receivers. In this aspect of the invention, the receivers translate the command signals and vary the operation of the electronic appliances accordingly.

In yet another aspect of the invention, a home controller may also be connected to the phone and power lines and may provide control of the electronic appliances from a remote location. The home controller includes a processor, memory, and a translator/transmitter which converts command signals to the appropriate protocol and transmits them over the power lines. A phone call to the home controller may be placed from the remote location. It can be established that if none of the phones within the house are answered within a predetermined amount of time, the home controller will answer. Through transmission of telephony signals such as ADSI-protocol or touch-tone, the homeowner may enter a password and a series of codes to change the settings of the appliances. For example, if the system user wishes to turn down the temperature within the house, a phone call is first placed which is answered by the home controller. At this point, the system user enters a password which provides access to the various internal control functions. Through entering a series of signals, the home controller may generate command signals which are then translated and transmitted over the power lines. As an example, a receiver at the thermostat, will translate the command signals and perform the appropriate functions for changing the operating status of the thermostat. These types of functions may also be used for changing the lighting or turning on and off different appliances within the home.

In order to access the home controller, the capability may also be provided for accessing this home controller through a remotely located personal computer. The user of the personal computer may access the home controller either through a modem or possibly through the World Wide Web. At this point, software included in the home controller and the personal computer allow the two devices to communicate and change the conditions within the house through use of signals transmitted over the phone lines and then the power lines.

DESCRIPTION OF THE PREFERRED EMBODIMENTS

Figure 1:
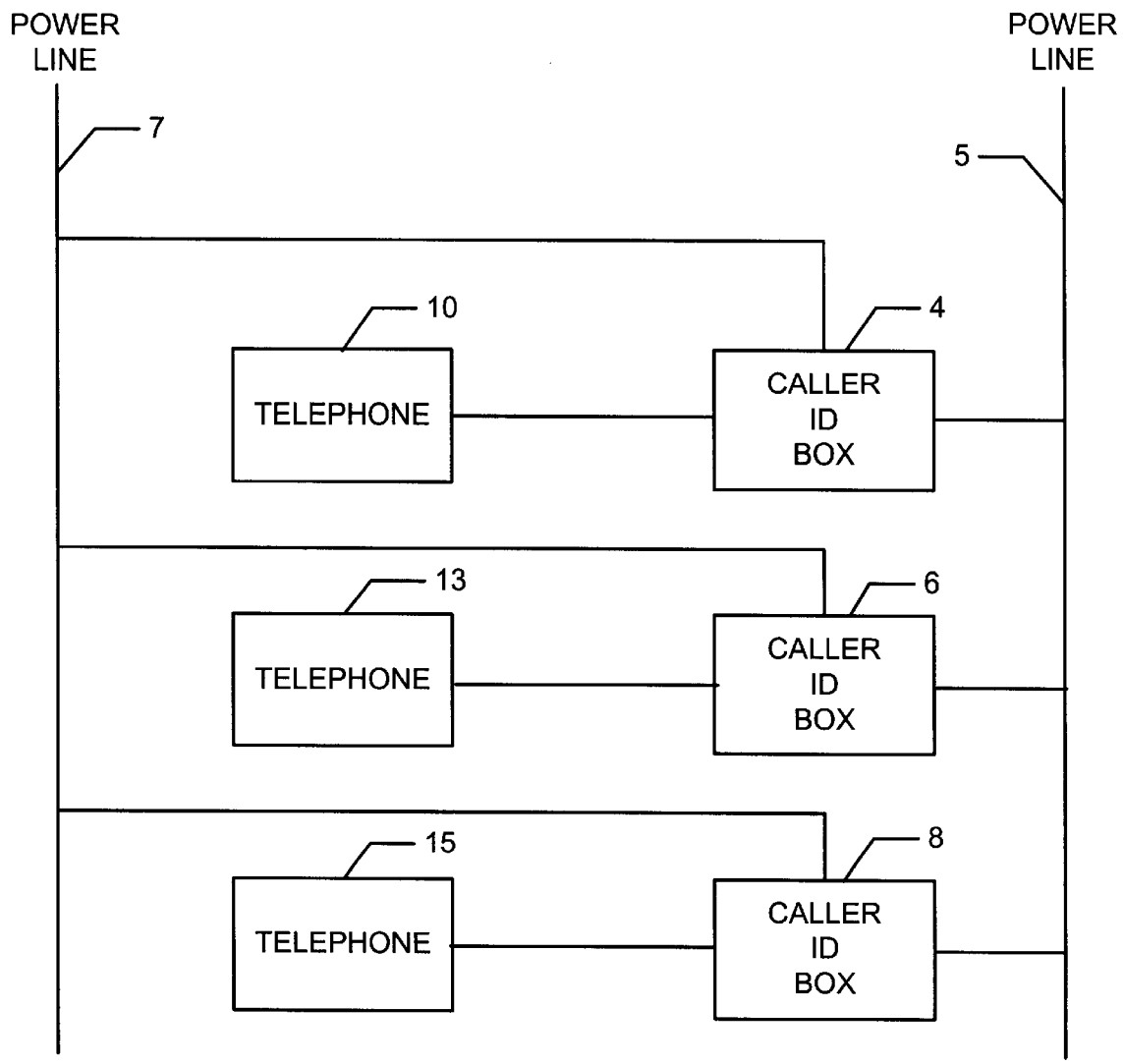
FIG. 1 discloses a system diagram for the control of multiple caller ID units.

Disclosed in FIG. 1 is a telephone system which includes multiple telephones and caller ID devices connected to a common telephone line. In the embodiment shown in FIG. 1 a telephone 10 is attached to the phone line through caller ID device 4. The caller ID device may include a broad class of devices that display caller and other information, and manage this information. This class of devices includes "display telephones" (e.g., ADSI telephones) and other similar devices. Also connected to the common phone line are telephones 13 and 15 connected through caller ID devices 6 and 8, respectively. All three caller ID devices are connected to power line 7. The power line provides all the necessary electrical energy in order to operate the caller ID devices.

In normal operation, phone calls received over the common phone line are logged into all caller ID devices attached to that line. Most phone calls now include non-voice caller information about the phone number from which the call is being placed, and the name of the person listed at that number. Caller information may also include the time and date in which the call was received. When a call is received, the caller information is displayed on the display of each caller ID device and a decision can be made by the viewer as to whether the call should be answered. Regardless of whether the call is answered, the caller information is placed in a log in the memory of the caller device. This information can be accessed and viewed at a later time. The caller ID devices also provide the option of deleting selected entries at the user's discretion. As a user scrolls through the entries in the call received log, a button or other device on the exterior of the caller ID device provides the capability to delete a selected received call stored in the log. In most systems, in order to keep the caller ID devices synchronized as to the number of calls received in the log, the system user must individually update each caller ID device using the external manual controls. In the invention described herein, a system is provided which automatically updates all the caller ID devices as to calls which are manually deleted at one of the caller ID devices.

Figure 2:
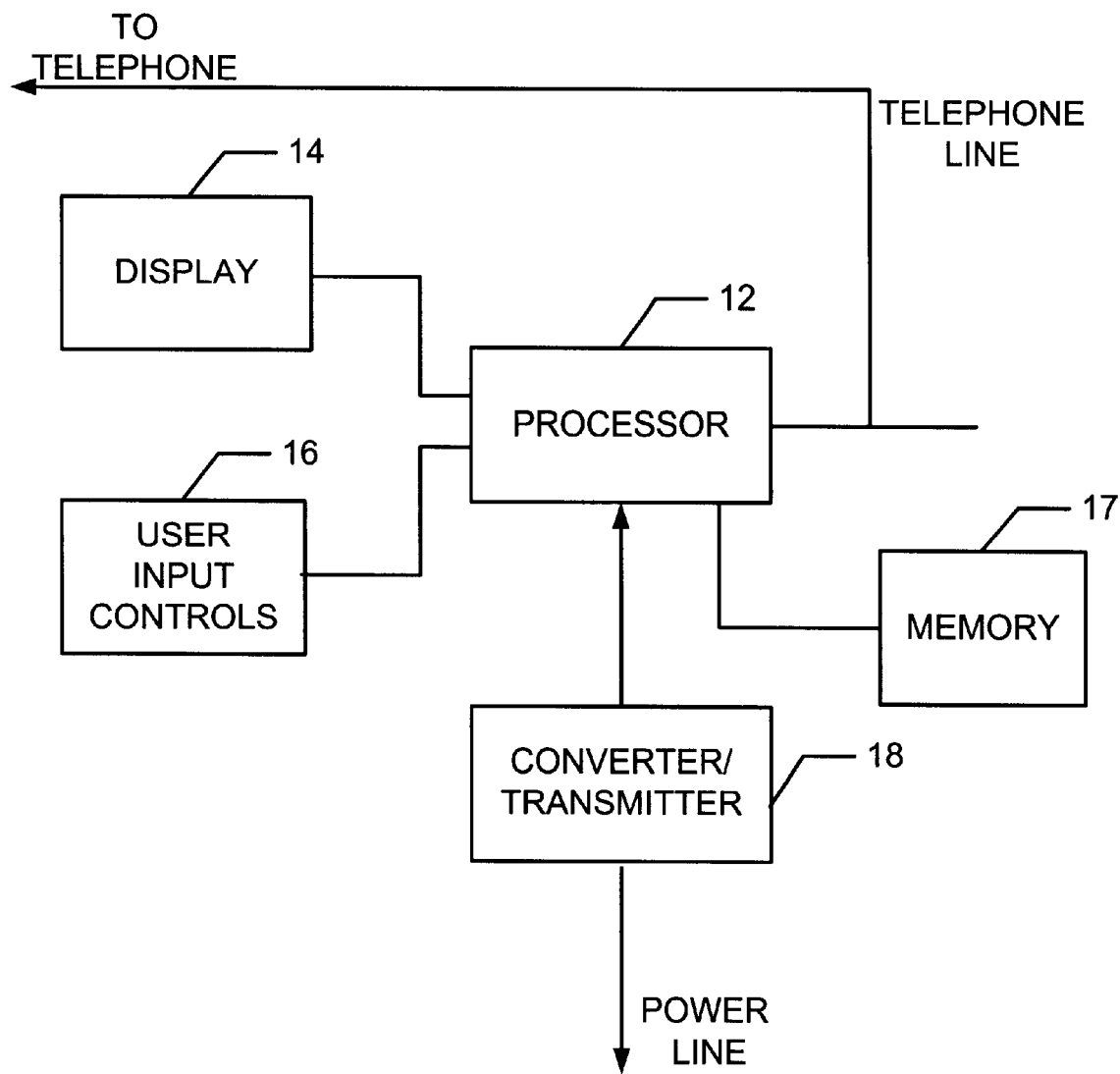
FIG. 2 is a system diagram for a caller ID unit.

FIG. 2 discloses the internal components of a caller ID device in accordance with the present invention. This diagram is representative of all the caller ID devices (4,6,8) disclosed in FIG. 1. Processor 12 provides the computational functions for the caller ID device and coordinates signals transmitted between the various components. The processor is in electrical connection with the common telephone phone line and extracts the caller information from incoming phone calls. The caller information is transmitted from the processor to display 14 so that it may be viewed by the user. Also included as part of the caller ID device is user input control 16, which includes at least one button or other device on the external portion of the caller ID device which provides the capability for the system user to scroll through entries contained in the log and to delete a selected number of these entries. Memory 17 is in electrical connection with processor 12 and includes the log of received calls. Also in electrical connection with the processor is the converter/transmitter 18. The converter/transmitter provides the capability of transmitting and receiving control signals over the same power lines from which the caller ID device receives its electrical energy. There are a number of components which can provide this type of functionality. One example is a protocol developed by the X-10 company. With a communications system such as the X-10 protocol devices contain or are connected to adjuncts with chips that specify an address for the device and are programmed to respond based on signals arriving over the power line. The signals are typically coded as short RF bursts (e.g., a binary 1 is represented by a 1 msec burst of 120 kHz at the zero crossing point). Binary coding, alphanumeric information and command codes are easily represented, and since speed is not as critical in this coordination function as in other applications, X-10 signaling would work well. The components which translate the X-10 protocol may be more sophisticated than simple on-off switches. These components may be incorporated into various electronic devices and perform sophisticated functions in response to control signals transmitted over the power lines.

Figure 3:
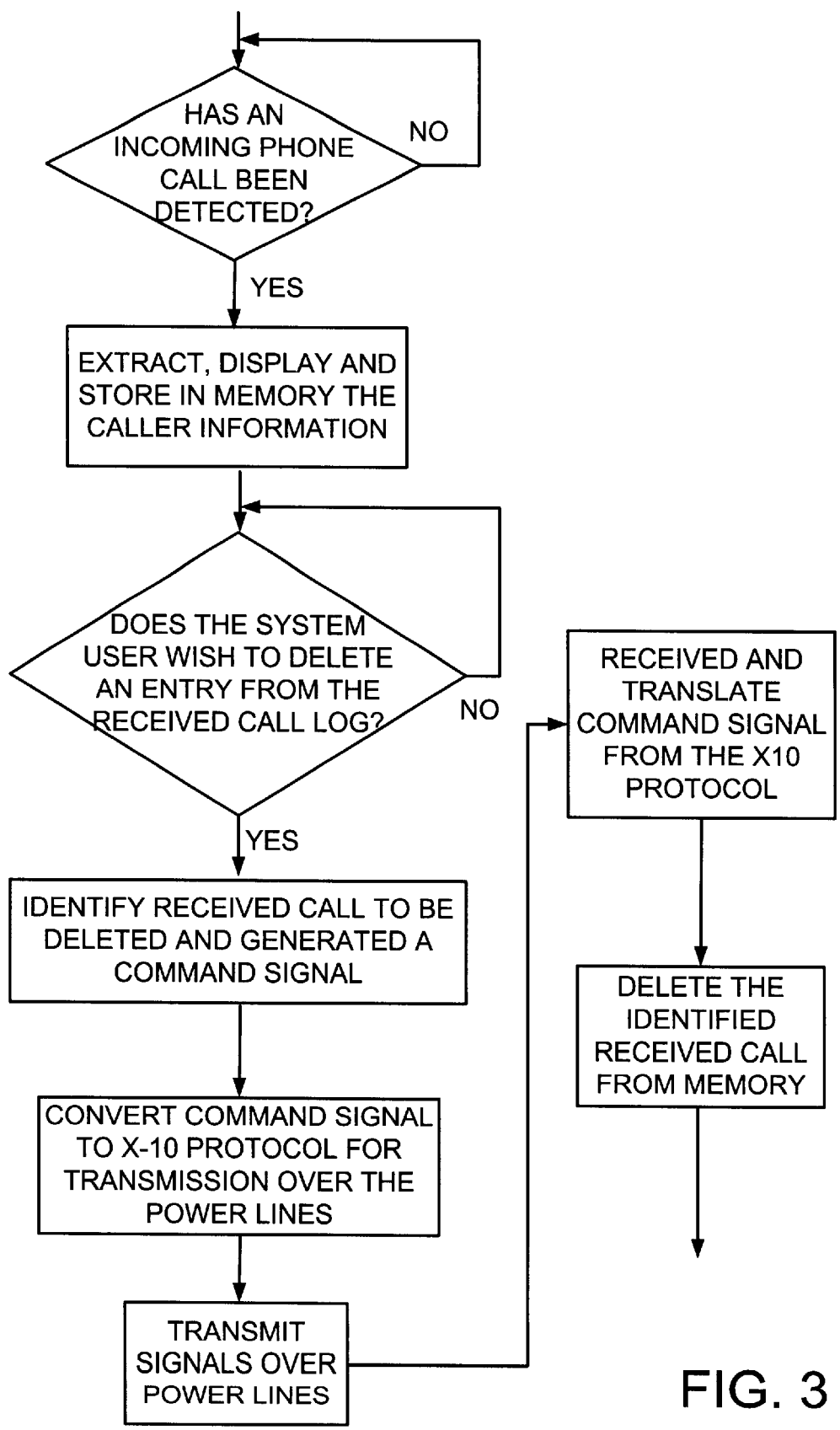
FIG. 3 discloses a flow diagram which describes the caller ID device synchronization system.

Disclosed in FIG. 3 is a flow chart which describes in detail the operation of the system disclosed in FIGS. 1 and 2. Anytime a phone call is received over the common phone line, it is logged into the memories of all the caller ID devices which are attached to the common phone line. The processor detects the incoming call, extracts the caller information, and transmits the caller information to both the display and the memory. When the system user wishes to view the logged calls, a button or other device is engaged on the exterior of the caller ID device which provides for the scrolling through of the received calls. The processor retrieves and provides the calls from memory and provides them to the display for viewing. In the event the system user wishes to delete a particular logged call, a button or other device is engaged and this entry is deleted. Each received call in the memory can be identified by the caller information. As was mentioned above, the caller information may include the number of the phone from which the call was placed, the name of the person registered to that phone, and the time at which the call was received. Using this identifying information, the processor creates a command signal to delete the selected incoming call. The processor transmits this command signal to the converter/transmitter. The converter/transmitter translates the command signal into the appropriate protocol for transmission over the power lines. After the translation process is complete, the command signal is transmitted over the power lines to the other caller ID devices. Each of the caller ID devices connected to the power lines receives the command signal and through its own converter/transmitter, translates the signal. The translated command signal is then provided to the processor. Based on the caller information included in the command signal, the processor accesses the memory and identifies the received call associated with that caller information. The processor then deletes the selected received call from memory. This process is repeated by all caller ID devices attached to the common telephone line and on the same power system. Because all of the caller ID devices contain the same internal components, which include the ability to transmit and receive command signals, the process of updating the memory logs and having all the caller ID devices coordinated, can be performed from any caller ID device which is on the same power supply system.

When an incoming phone call is received it may be desirable to change the operating status of electric appliances in the vicinity of a phone. For example, if a phone call is received during the night it would be desirable to have lights automatically turn on in the vicinity of the phones so that they may be found easily. It may also be desirable to mute or turn down the volume of television or audio equipment in the vicinity of the telephones in an automated system. The system disclosed in FIG. 4 provides this type of functionality.

Figure 4:
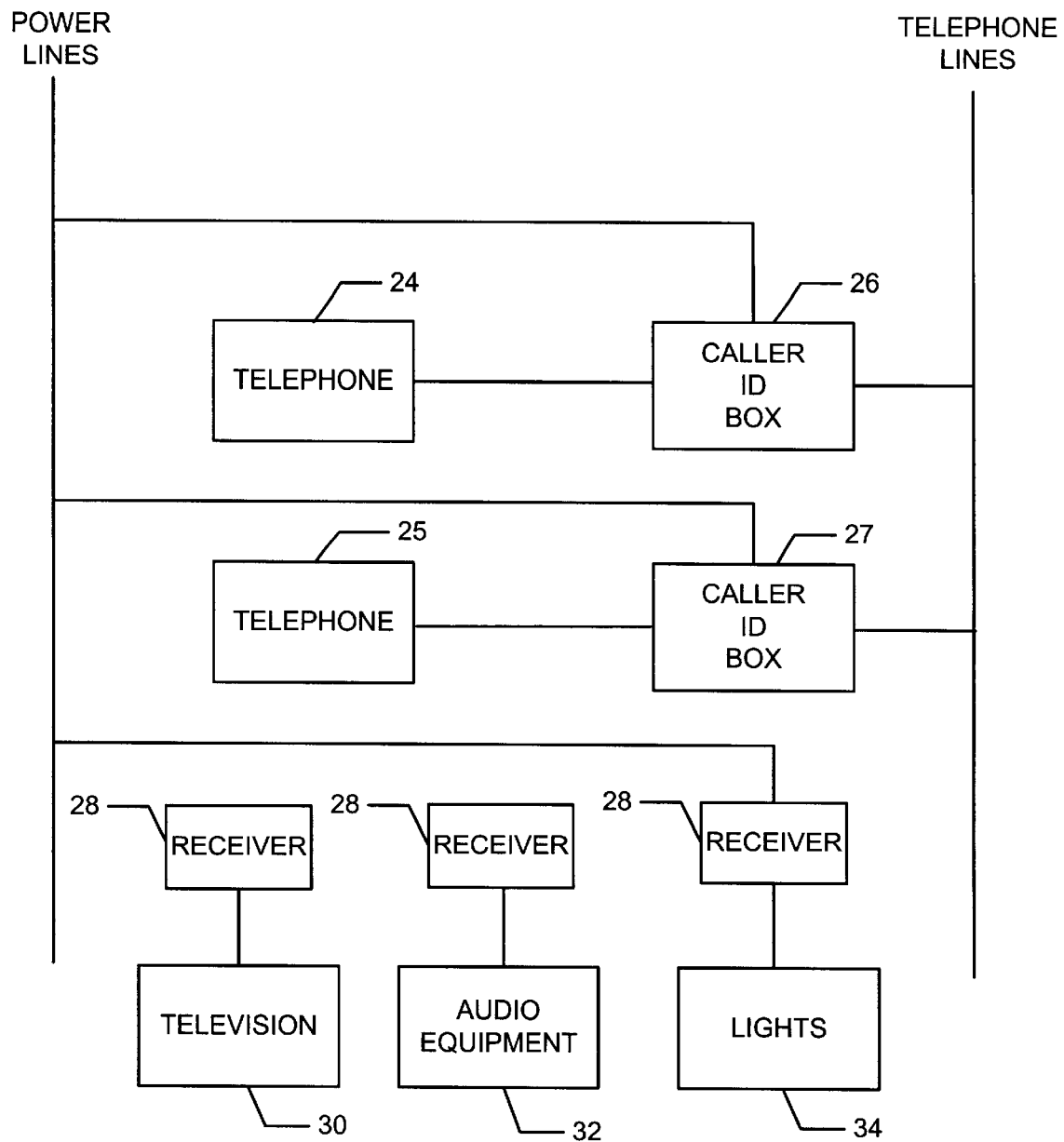
FIG. 4 is a system diagram for an electronic appliance control system.

Disclosed in FIG. 4 is an embodiment of the invention which incorporates the features described above into a system which provides automatic control of various electronic appliances. As with the embodiment described above, the system includes both an incoming telephone line as well as internal power lines which provide electrical power to the caller ID devices 26 and 27. The caller ID devices are connected to telephones 24 and 25 respectively. Also receiving energy from the power lines are a series of home appliances which may include a television 30, environmental controls 32, and lights 34. Connected between the aforementioned appliances and the power lines are receivers 28 which translate command signals received over the power lines and control the electrical power received by the appliances. For example, in the case of the lights 34, the caller ID device 26 may transmit a command signal over the power lines to either turn up or turn down the lights. The receiver 28 translates this command signal and varies the lighting level in the requested manner. These changes can also be made to the other electronic appliances connected to the system.

The system configuration of the caller ID devices in FIG. 4 is substantially similar to that disclosed in FIG. 2. The only difference is the increased functionality of the processor for controlling the electronic appliances and the inclusion of additional control instructions for changing the operating status of the electronic appliances. In the situation of multiple caller ID devices, it may be advantageous to provide this functionality to only one of the caller ID devices to avoid conflicting signals being transmitted over the system.

Figure 5:
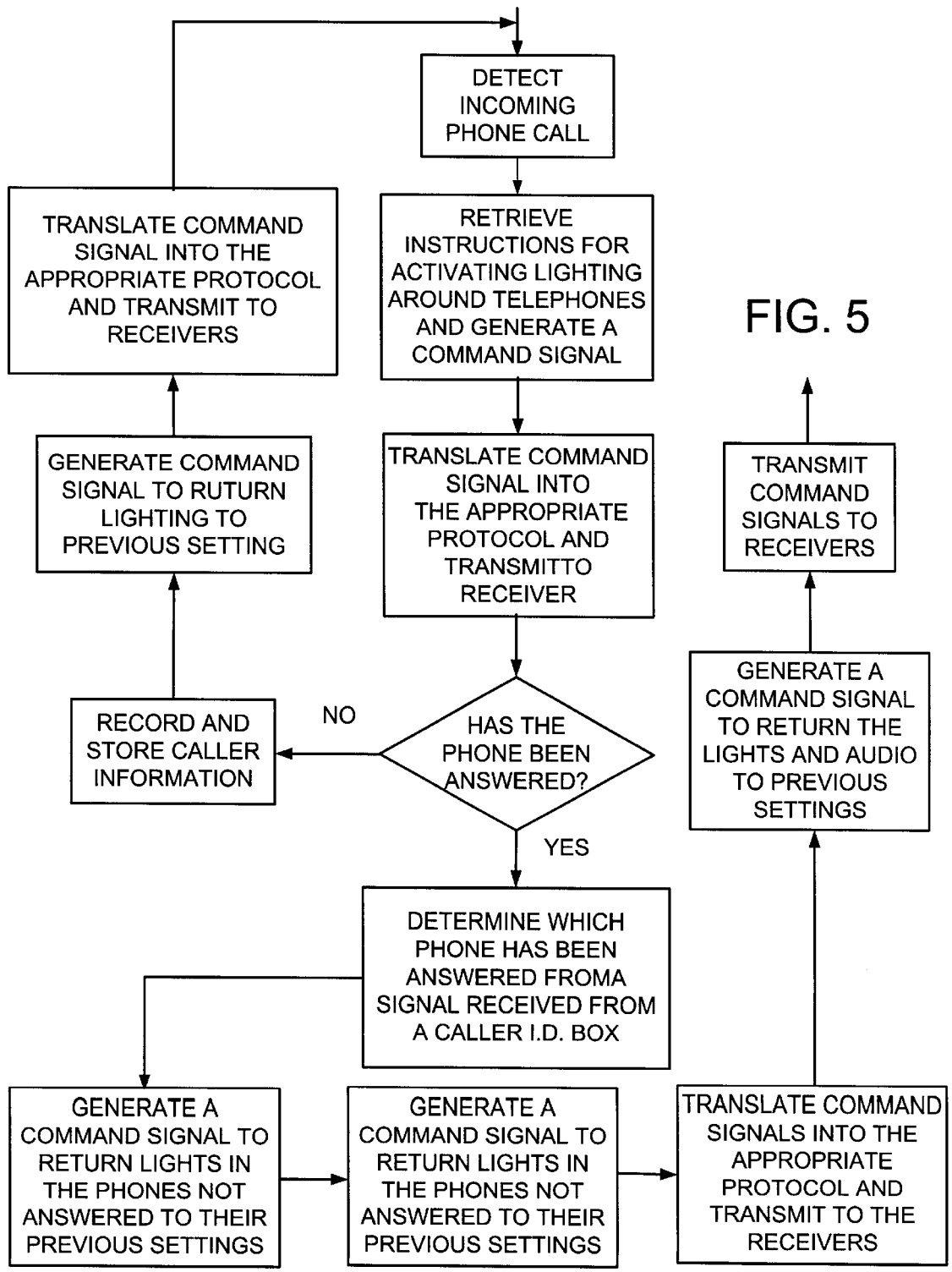
FIG. 5 discloses a flow diagram which describes the operation of the electronic appliance control system.

The flow chart in FIG. 5 describes in detail the operation of the system disclosed in FIG. 4. When an incoming phone call is detected, the caller ID device which includes the additional functionality will retrieve instructions from the memory for activating the lighting. The instructions include address information for the receivers which control the lighting adjacent to the telephones. The processor provides this information to the converter/transmitter which converts the command signal to the appropriate protocol and transmits this information over the power lines. Each of the receivers connected to the power system will receive the command signal, but only the receiver to which the information was addressed will translate and covert it. With the converted command signal, the receiver will change the operating status of the lighting around the phone accordingly. Once a phone is answered, the caller ID device connected to the phone detects this, and sends out an information signal over the power system identifying which phone has been answered. In response, the caller ID device with the additional functionality will generate command signals to turn off lights in the vicinity of the phones which are not in use.

Additionally, by using the information about which phone has been answered. The caller ID device with the additional functionality, may generate command signals for controlling a television or audio equipment in the vicinity of the telephone. The processor will generate a command signal to turn down or mute the volume, and attach the address of the receiver controlling the power flow to the appliance. The signal is converted to the appropriate protocol and transmitted over the power lines. It is received by all the receivers and translated by the receiver to which it was addressed. The volume of the appliance is then changed in the desired fashion.

When the phone call is complete and the receiver is hung up, this is detected by the caller ID device connected to the telephone which was answered. This information is provided to the caller ID device with the additional functionality. In response, the caller ID device will generate control signals with the appropriate addresses for returning the electronic appliances to their previous state of operation. This signal is sent out over the power lines, and the receivers perform the requested functions. A time delay can be built into the implementation of these instructions so that the system user can reach a destination before the lights are turned out.

As an additional feature incorporated into the caller ID device, the timing information associated with the incoming calls (e.g., timing information sent as part of signals from the incoming calls or timing tracked in the device itself) may be used to update clocks receiving energy from the power lines. These clocks may be stand alone electric clocks, or they may be clocks incorporated into other electronic appliances. In order to update the remotely located clocks, the processor in the caller ID device converts time information into command signals which then are transmitted over the power lines by the convert/transmitters. The receivers for the electronic appliances and electric clocks translate the command signal and update the clock accordingly.

Figure 6:
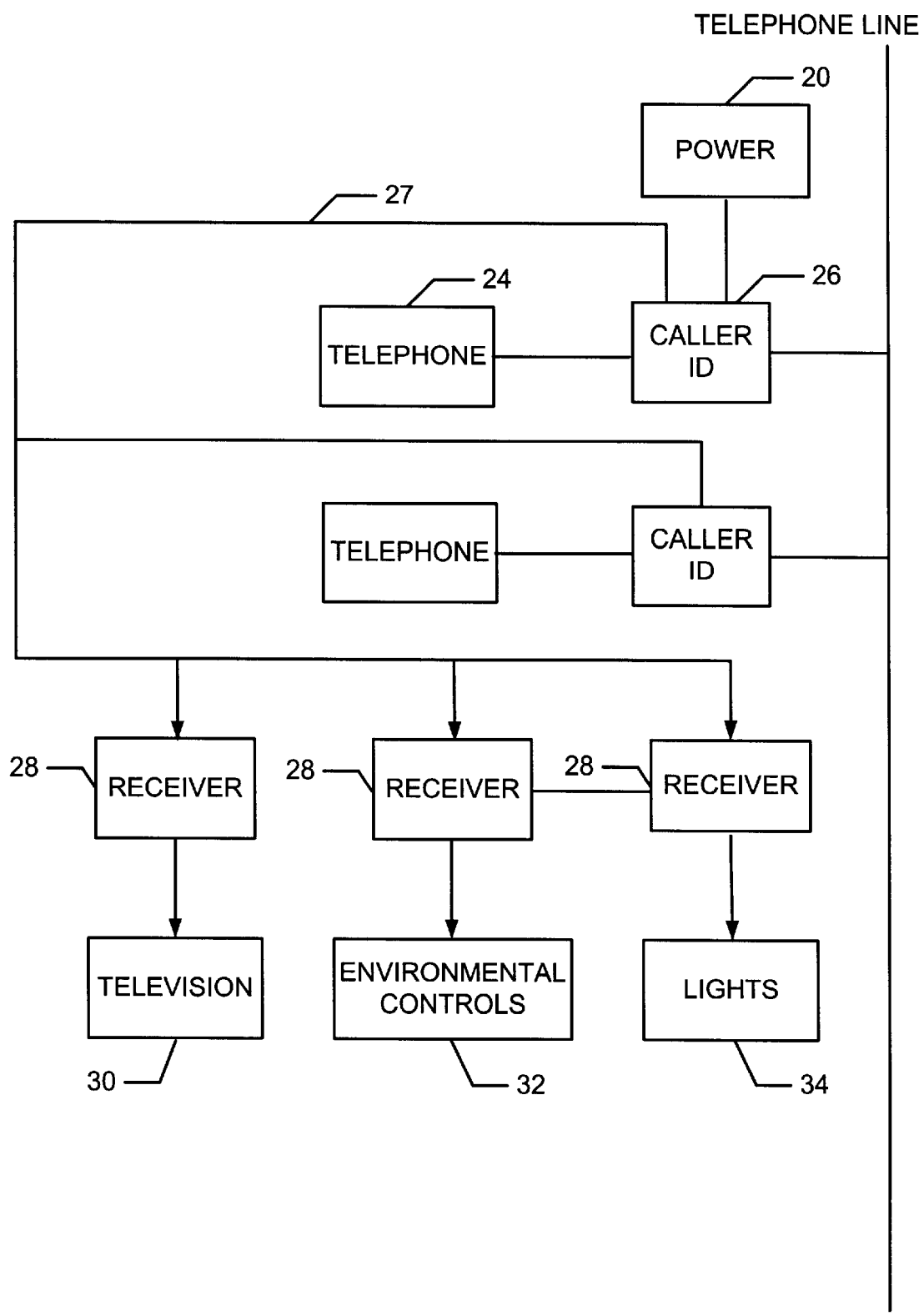
FIG. 6 discloses a system diagram for a hard wired electronic appliance control system.

In the various embodiments of the invention described above, the power lines were described as one way of carrying control signals from the home controller to the remotely located receivers and caller ID devices. It is also conceivable that a hard wired system could be substituted for carrying command signals to remotely located receivers. This embodiment of the invention is shown in FIG. 6. In this case, an entire electrical network is set up between the caller ID devices and the electronic appliances. A power source 20 is connected through caller ID device 26 which provides the energy for transmitting signals to the other caller ID devices and the remotely located electronic appliances. The hard wired circuit 27 provides all the electrical connections between the various devices. The appliances receive the energy for normal operation through a standard power system. This system provides the same functionality as the systems described above, but instead of transmitting signals over the power lines these signals are transmitted over a hard wired circuit.

Figure 7:
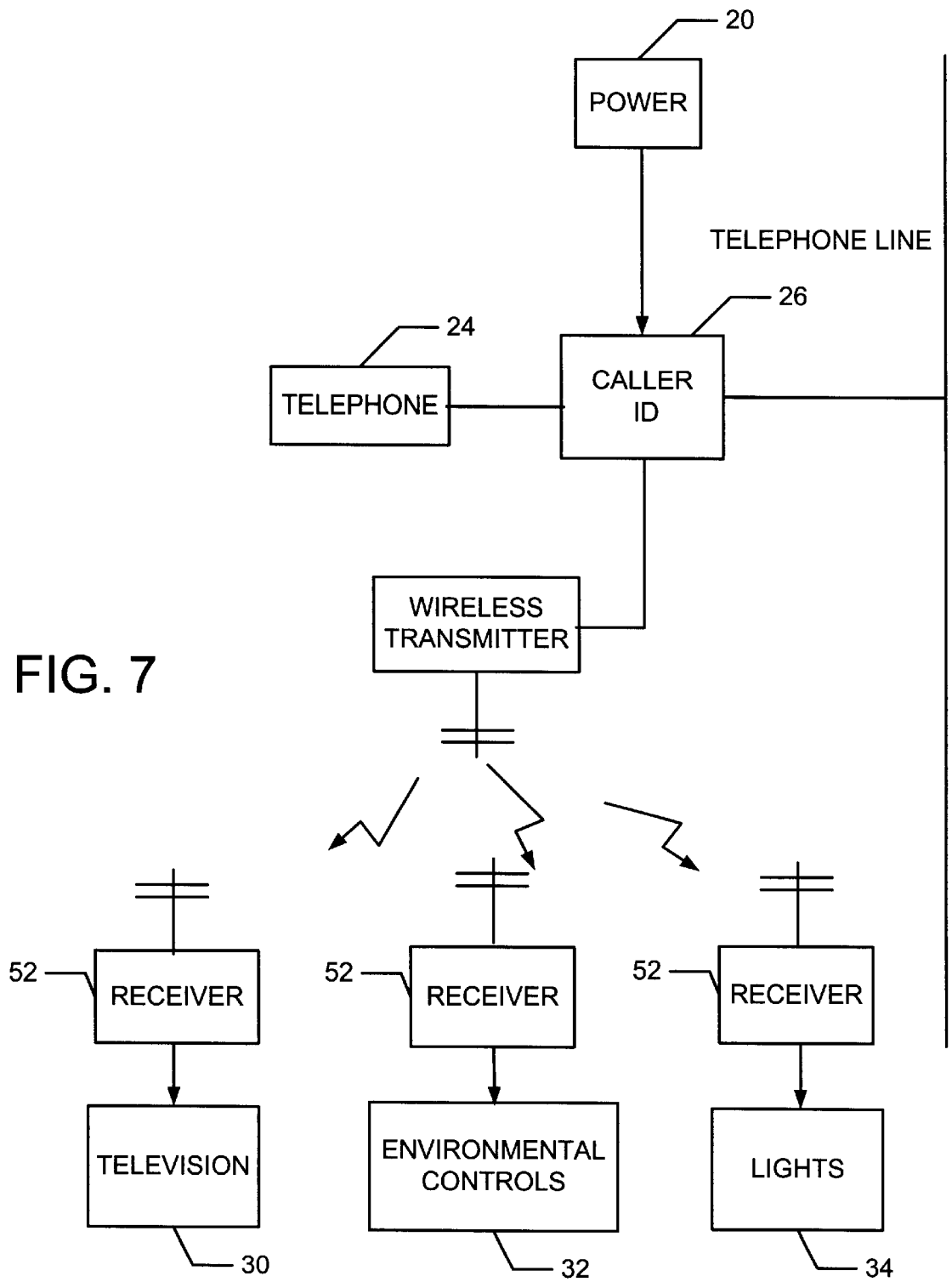
FIG. 7 discloses a system diagram for a wireless electronic appliance system.

In yet another embodiment of the invention, communication can be established between the caller ID devices and the electronic appliances through a wireless communications network. This system is shown in FIG. 7. As in the other embodiments, the caller ID device is connected to the common telephone line and to a telephone. Also connected to the caller ID device is wireless transmitter 50. Located at each of the electronic components is a wireless receiver 52 which has the capability to receive and translate RF signals. The receivers control the operating status of the appliances to which they are connected. When an incoming phone call is detected by the caller ID device, the processor may generate command signals to change the operating status of the remotely located appliances. Once a command signal has been generated, it is provided to wireless transmitter which broadcasts it over the airwaves. Each command signal transmitted includes address information so that only the receiver of the appliance in which a change is desired will and act on the signal. In the situation where there are multiple caller ID devices connected to a common telephone line, each caller ID device is provided with a wireless transmitter/receiver to communicate with the receivers at the electronic appliances and the other caller ID devices.

Figure 8:
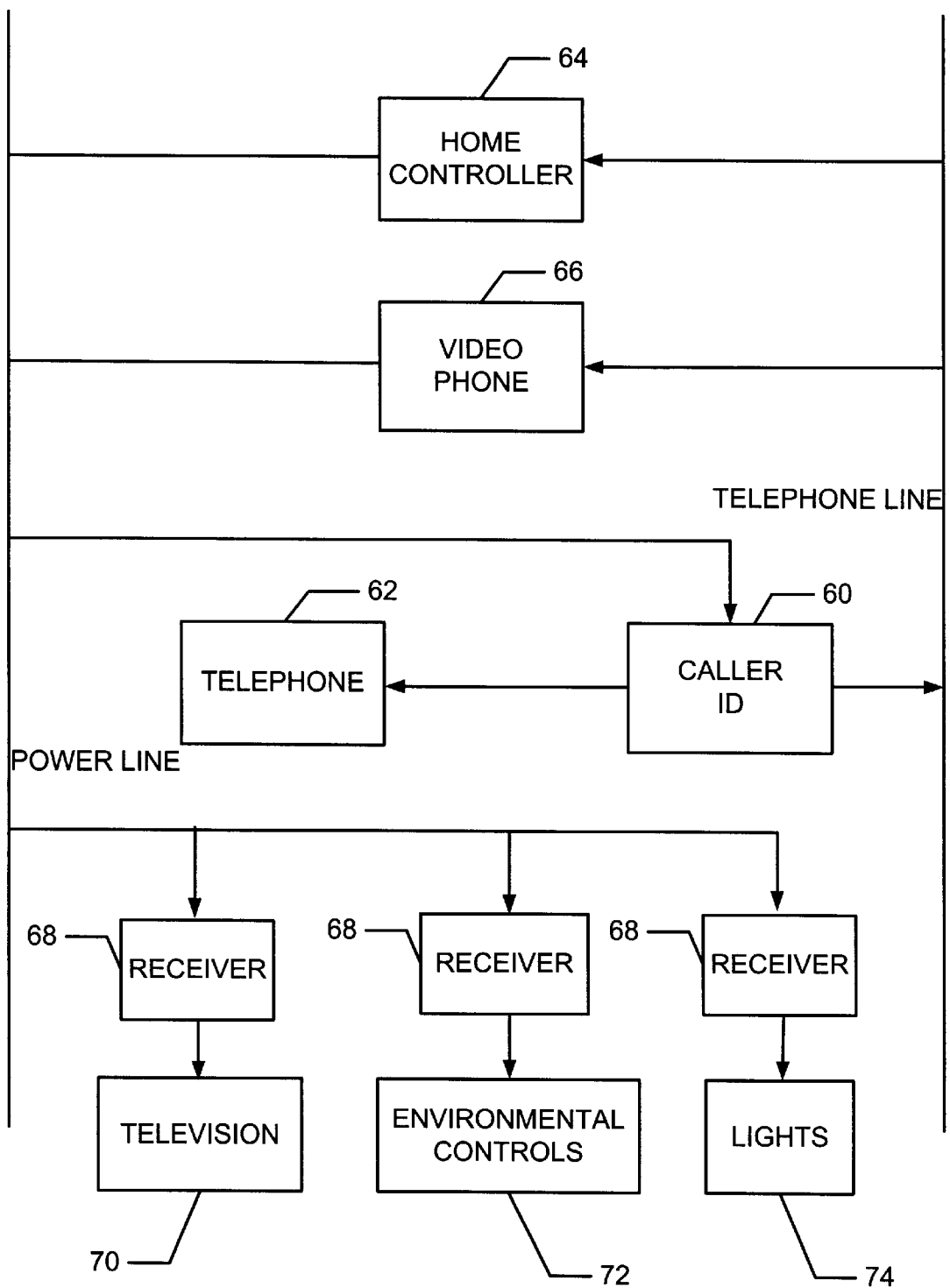
FIG. 8 discloses a system diagram for a home controller system.

The processing capabilities included in the caller ID devices above, can also be incorporated into a home controller device which is separate from the caller ID device. Disclosed in FIG. 8 is a home control system which provides automated control of electronic appliances within the home and can be accessed remotely. As with the embodiments described above, the system includes both an incoming telephone line as well as power lines which provide electrical power to the caller ID devices 60 and a number of electronic appliances. The caller ID device is connected to telephone 24. Also connected to the power lines are a series of home appliances which may include a television 70, environmental controls 72, and lights 74. Connected between the aforementioned appliances and the power lines are receivers 68 which translate command signals received over the power lines and control the electrical power received by the appliances.

Figure 9:
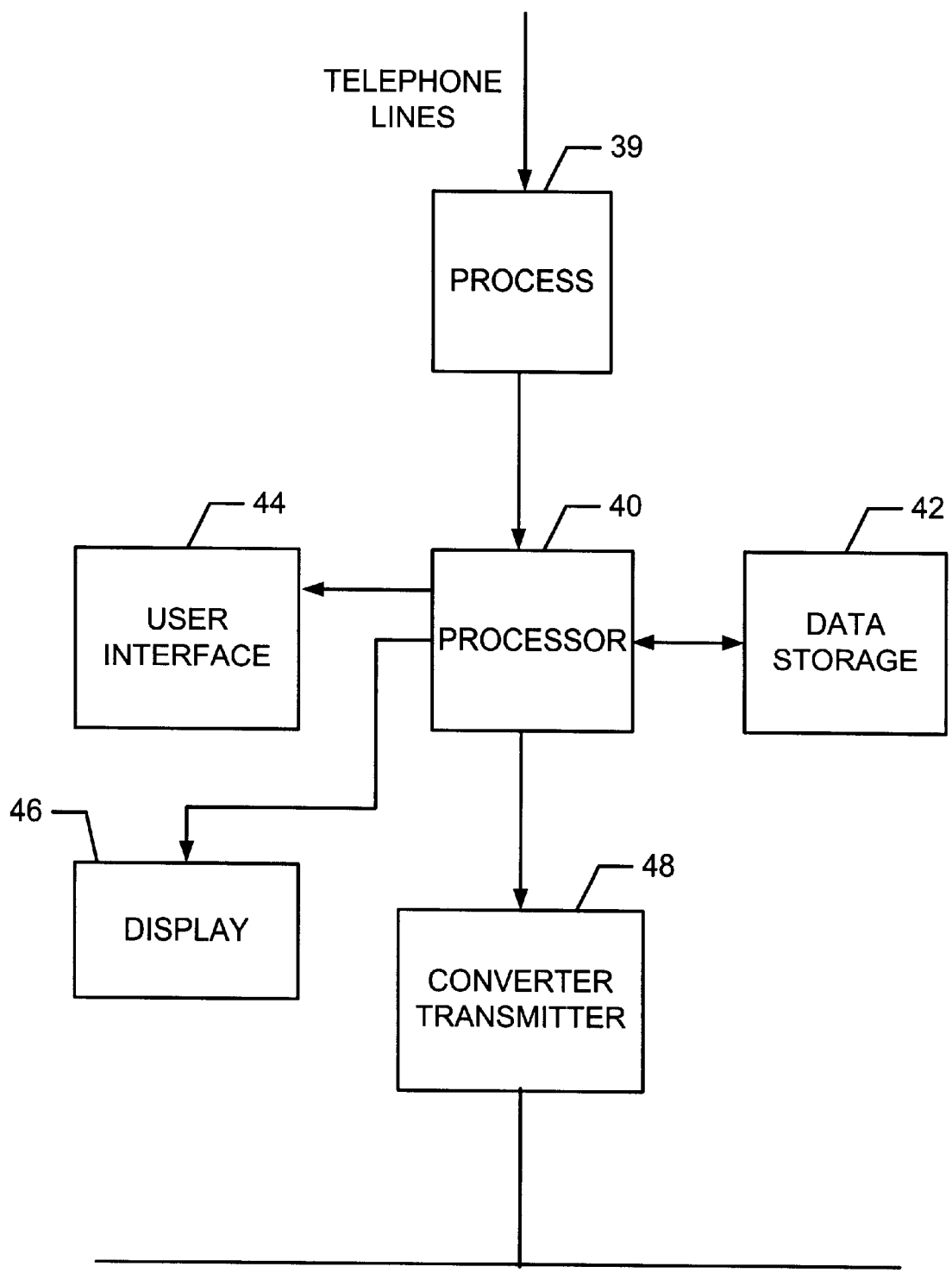
FIG. 9 is an internal system diagram for a home controller.

Disclosed in FIG. 9 is a system diagram for the home controller 64. Processor 40 provides the computational functions for the home controller and coordinates signals transmitted between the various components. A telephonic interface 39 is in connection with the common telephone phone line and extracts the desired information from incoming phone calls and provides this to the processor. Data storage 42 is in connection with processor 40 and includes various instructions and stored settings which the processor will use to provide home control. Also in electrical connection with the processor is the converter/transmitter 18. The converter/transmitter provides the capability of transmitting and receiving control signals over the same power lines from which the caller ID device receives its electrical energy. As with the embodiments described above, the X-10 protocol can be used for this purpose. The system may also include user interface 44 and display 46. The user interface may include at least one button or other device which provides the capability for the system user to enter information or configure display 46 in order to view selected information.

Figure 10:
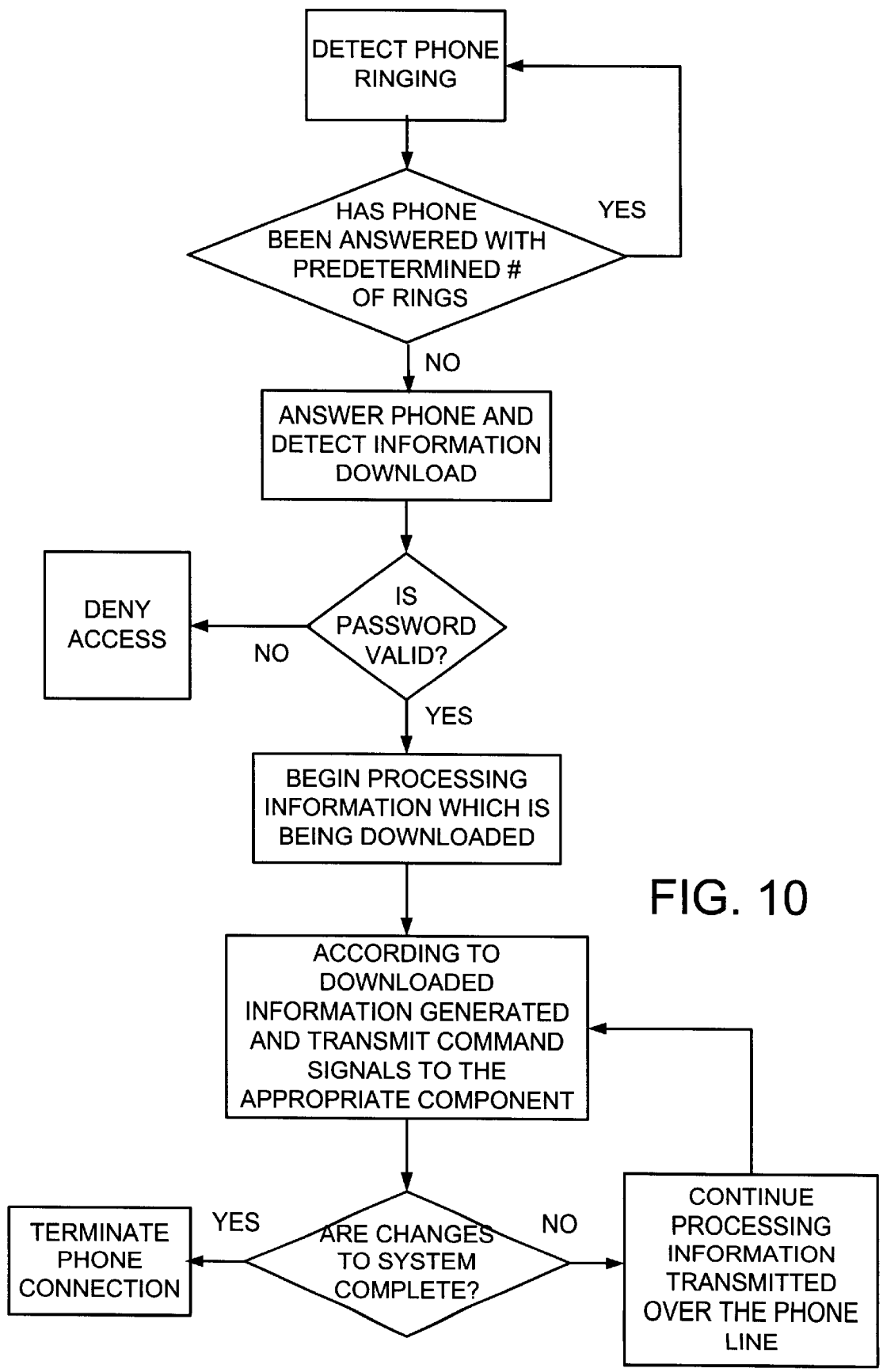
FIG. 10 is a flow diagram which describes the operation of the home controller system.

FIG. 10 discloses a flow chart which describes the various operations of the home controller system. The system is designed such that it will detect when there is an incoming call, and if the phone is not answered within a predetermined number of rings, the home controller will answer the phone and download home control instructions. The home controller may respond to a variety of telephony signals which may include ADSI protocol or touch tone. With the ADSI protocol, which is the signal protocol used with most caller ID devices and display phones, a remote site is contacted which downloads commands from the system user. The remote site then contacts the home controller over the phone lines and provides the instructions in ADSI protocol. As with the caller ID information described above, the system is able to translate this information into command signals. With a touch tone system, the system user merely needs to enter the proper sequence of numbers on a touch tone phone. The controller is programmed to recognize sequences and translate this to command signals. Once the call is answered, the first step in this process is to determine whether the source of the information is authentic.

Once contact is established with the home controller, a password check is first performed and, if this test is not passed, access is denied to the system. If the password is valid, the download of command information is begun. The processor within the home controller translates this information into the appropriate command signal which will then be transmitted over the power grid. These signals are continually transmitted until all information has been processed and sent. Once this is done, the phone connection is terminated.

Each of the receivers at the appliances has a particular address which provides for the translation of only signals addressed to that destination. The processor within the home controller includes this address in any control signals that are transmitted. Once the control signal has been received at the designated address, the software included in the processing element of that receiver translates the command signal and implements the appropriate changes to the attached electronic appliance.

In the embodiment of the invention disclosed in FIG. 8 instructions may also be transmitted to the home controller from a remotely located computer. Access is gained to the home controller via a modem over the phone lines, and once a connection has been established software included in the remotely located computer can be used to generate commands which are translated by the home controller and used to vary the operational status of electronic appliances connected to the system.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

I claim:

1. A caller ID device connectable to a telephone line and a transmission network comprising:
    a processor which receives signals which include instructions for deleting records of telephone calls received over the telephone lines, from at least one external source, where the external source may comprise at least one of: the telephone line and a user input device, where said processor translates the external signals into command signals;
    a converter/transmitter which receives and converts the command signals to a predetermined format and transmits the formatted command signals over the transmission network to at least one additional caller ID device; and
    a receiver incorporated into each of the at least one additional caller ID device which receives and translates the formatted control signals received over the transmission network.

2. The caller ID device of claim 1 wherein the data signals further include instructions for controlling at least one electronic device.

3. The caller ID device of claim 2 wherein the at least one electronic device includes at least one of: television, lighting, VCR, and environmental controls.

4. The caller ID device of claim 2 wherein the external signals received over the telephone line are in the ADSI format.

5. The caller ID device of claim 2 wherein the external signals received over the telephone line are in the touch tone format.

6. The caller ID device of claim 2 wherein the transmission network is at least one power line.

7. The caller ID device of claim 6 wherein the formatted command signal is in a X-10 protocol.

8. The caller ID device of claim 1 wherein the processor is further configured to change at least one state of the caller ID device in response to receipt of the translated format control signal from the receiver.

9. A method of controlling electronic components connected to a communications network comprising the steps of:
    receiving signals at a caller ID device through a plurality of external inputs including a telephone line, wherein the command signals include instructions for deleting records of telephone calls received over the telephone line;
    converting the received signals to command signals;
    converting the command signals to a predetermined format and transmitting the converted command signals over the communications network to at least one additional caller ID device;
    receiving and translating the formatted command signals at the at least one additional caller ID device; and
    deleting records of telephone calls received over the telephone line in response to the received formatted command signals.

10. The method of claim 9 wherein the communications network is a power line.

11. The method of claim 10 wherein the formatted command signals are in a X-10 protocol.

12. The method of claim 9 wherein the received signals are in a ADSI format.

13. The method of claim 9 wherein the received signals are in a touch tone format.

14. The method of claim 9 wherein the external signal further includes instructions for changing the state of at least one electronic component, and the converted command signal is transmitted over the communications network to the at least one electronic component, where the electronic component receives and translates the converted command signal and changes the state of the electronic component.

15. The method of claim 14 wherein the at least one electronic components includes at least one of: television, lighting, VCR, and environmental controls.

16. The method of claim 15 wherein the command signal includes instructions for updating electronic clocks with connections to the communications network.

* * * * *